United States Patent
Curtis (10) Patent No.: US 6,739,308 B1
(45) Date of Patent: May 25, 2004

(54) FUEL IGNITER AND HEAD FOR USE IN DIESEL ENGINES AND RELATED SYSTEMS AND METHODS

(75) Inventor: John M. Curtis, Seattle, WA (US)

(73) Assignee: Hatch & Kirk, Inc., Seattle, WA (US)

( * ) Notice: Subject to any disclaimer, the term of this patent is extended or adjusted under 35 U.S.C. 154(b) by 0 days.

(21) Appl. No.: 10/155,473

(22) Filed: May 24, 2002

(51) Int. Cl.[7] ................................. F02B 19/08
(52) U.S. Cl. .................. 123/262; 123/276; 123/306; 123/315; 123/73 C
(58) Field of Search ................. 123/262, 276, 123/306, 315, 73 C, 90.15, 260, 446, 143 A, 143 R, 670, 143 B (56) References Cited

U.S. PATENT DOCUMENTS

| | | | |
|---|---|---|---|
| 3,954,089 A | 5/1976 | Hardesty | 123/30 |
| 4,384,553 A | * 5/1983 | Schechter | 123/143 A |
| 4,562,807 A | 1/1986 | Matsui | 123/276 |
| 5,024,193 A | * 6/1991 | Graze, Jr. | 123/259 |
| 5,692,776 A | * 12/1997 | Rink et al. | 280/741 |
| 5,746,163 A | 5/1998 | Green | 123/65 |
| 6,101,990 A | 8/2000 | Green | 123/65 |
| 6,158,413 A | 12/2000 | Kimura | 123/306 |
| 6,381,958 B1 | * 5/2002 | Kamen et al. | 60/517 |

* cited by examiner

*Primary Examiner*—Willie R. Wolfe
*Assistant Examiner*—Johnny H. Hoang
(74) *Attorney, Agent, or Firm*—Graybeal Jackson Haley LLP (57) ABSTRACT

The present invention provides a piston for a diesel engine that reduces emissions generated during the combustion of fuel in a combustion chamber and a head that allows more air to flow into and out of the combustion chamber. The piston includes an igniter that ignites fuel injected into the combustion chamber and a piston bowl. The piston bowl agitates air in the combustion chamber to quickly mix the fuel and air before the igniter ignites the fuel and to reduce carbon build-up from unburned fuel in the combustion chamber. By igniting the fuel shortly after it is injected into the combustion chamber, the igniter reduces the time between injection and combustion of the fuel in the combustion chamber. Thus, the amount of NOx produced during combustion is reduced. Furthermore, injection of the fuel can commence when the piston is closer to top dead center and thus more power can be generated. By allowing more air to flow into and out of the combustion chamber, the amount of unburned fuel in the combustion chamber is reduced and thus the amount of particulates produced during combustion is reduced.

26 Claims, 4 Drawing Sheets

FUEL IGNITER AND HEAD FOR USE IN DIESEL ENGINES AND RELATED SYSTEMS AND METHODS

BACKGROUND

Emissions from diesel-powered locomotives contribute to air pollution and have significant health and environmental effects. Nitrogen oxides (NOx), hydrocarbons (HC) and particulate matter (PM) are the major components of such emissions that significantly impact the environment. NOx is a significant component of smog and acid rain and can combine with HC to form ground-level ozone, which is another significant component of smog. Ozone can be hazardous to people by damaging lung tissue and causing congestion. PM can cause headaches, eye and nasal irritation and lung inflammation.

The 1990 Clear Air Act amendments mandated the EPA to establish emissions standards for a variety of previously unregulated sources, including locomotives. Consequently, the EPA promulgated a comprehensive program that included limits on the various emissions components from diesel-powered locomotives. For locomotives manufactured between Jan. 1, 1973 and Jan. 1, 2000 the level of NOx must be 9.5 grams per brake-horsepower-hour (g/bhp-hr) or less, PM must be 0.6 g/bhp-hr or less, HC must be 1.00 g/bhp-hr or less. These maximum levels also apply to any locomotive built and rebuilt during the same time frame. For locomotives manufactured between Jan. 1, 2002 to Jan. 1, 2004 the level of NOx emitted must be 7.4 g/bhp-hr or less, PM must be 0.45 g/bhp-hr or less and HC must be 0.55 g/bhp-hr or less. Finally, for locomotives manufactured after Jan. 1, 2005 the level of NOx emitted must be 5.5 g/bhp-hr or less, PM must be 0.20 g/bhp-hr or less and HC must be 0.30 g/bhp-hr or less.

Unfortunately, most diesel-powered locomotives currently operating emit NOx, PM and HC in quantities exceeding these EPA established limits. Thus, there is a need for a diesel-powered locomotive that can provide the same or more power while emitting less NOx, PM and HC.

SUMMARY

The present invention provides a diesel engine that can generate more power while generating fewer emissions. The diesel engine comprises a cylinder assembly that includes a head operable to remove combusted fuel from the combustion chamber and a piston comprising an igniter operable to ignite fuel injected into a combustion chamber and a top section operable to agitate the air in the combustion chamber. The head allows the engine to generate more power with fewer emissions by permitting more combusted fuel to flow out of the combustion chamber, and thus, more fresh air to flow into the combustion chamber. More fresh air in the combustion chamber further reduces the amount of unburned fuel remaining after combustion. Thus, the amount of PM in the engine's emissions is reduced. The igniter allows the engine to generate more power with fewer emissions by igniting the fuel quickly after it is injected into the combustion chamber. This reduces the time between injection and combustion of the fuel in the combustion chamber and thus, the amount of NOx produced during combustion. In addition, injection of the fuel can commence when the piston is closer to TDC and thus more power can be generated. The top section allows the engine to generate more power with fewer emissions by quickly mixing the fuel and air as the fuel is injected into the combustion chamber. Thus, the igniter can ignite the fuel quickly after the fuel is injected, and carbon build-up from unburned fuel in the combustion chamber can be reduced.

In one aspect of the invention, the igniter radiates heat to the fuel as the fuel is injected across the igniter's top surface. Consequently the igniter can be made of any material, such as Inconel® 625 or 750X, that will retain more heat than the remaining structure of the piston. Furthermore, the igniter can use some of the heat generated by previous combustion events to ignite the fuel in subsequent combustion events.

In another aspect of the invention, the igniter can be releasably attached to the piston to allow one to remove and install different igniters having different shapes and sizes and made from different materials. By modifying these one can change the performance characteristics of the engine to match changing conditions or as desired. In addition, the igniter can include grooves for agitating the air in the combustion chamber in a plane perpendicular or substantially perpendicular to the piston's movement toward the head. This helps mix the fuel and air quickly so that the igniter can quickly ignite the fuel.

In another aspect of the invention, the top section of the piston can be formed to agitate the air in a direction substantially toward and away from the head, for example, circulating the air in a plane substantially parallel to the direction the piston travels. For example, the piston can include a piston bowl and squish land. The piston bowl can include a bowl diameter, a transition radius, a bowl radius and a bowl surface all sized and located relative to a piston diameter and piston longitudinal axis. The squish land can include an inside edge and a squish surface also sized and located relative to a piston diameter and piston longitudinal axis.

In another aspect of the invention, the head includes a primary chamber that receives a flow of combusted fuel through at least two exhaust ports and directs the flow out of the head, and at least one passage that receives a flow of combusted fuel through at least one other exhaust port and directs the flow out of the head. In addition, the at least one passage can include a narrow section operable to accelerate the flow of combusted fuel through the passage.

DETAILED DESCRIPTION

Before discussing the invention and various embodiments of the invention, a brief review of the combustion process in the diesel cycle will be helpful in understanding how the invention increases power output while reducing undesirable emissions. In either a two-stroke or four-stroke diesel cycle, the combustion process is substantially the same.

A typical diesel engine includes a cylinder, a head attached to one end of the cylinder and having a valved exhaust passage, and a piston disposed in the cylinder that reciprocates toward and away from the head. Intake ports supply air to a combustion chamber defined by the space between the piston and the head. A fuel injector injects fuel into the combustion chamber. Exhaust passages convey the combusted air and fuel from the combustion chamber to allow the air from the intake ports to charge the combustion chamber for the next combustion event.

For purposes of this discussion, the combustion process has been arbitrarily chosen to begin when the piston is located at bottom dead center (BDC), where the piston stops moving away from the head. At BDC, the piston starts to move toward the head, and fresh air flows through the intake ports and into the combustion chamber. This flow of fresh air forces the combusted fuel from the previous combustion event to flow through the exhaust passages in the head. As the piston continues to move toward the head, the intake ports are closed, and the piston forces the air from the intake ports into the combustion chamber, and thus, the exhaust through the exhaust passages in the head. As the piston continues to move further toward the head, the exhaust passages are closed, and the piston compresses the air from the intake ports in the combustion chamber. As the piston approaches top dead center (TDC)—where the piston stops moving toward the head and starts moving away from the head—the injector injects fuel into the combustion chamber and continues to inject fuel as the piston passes TDC and moves toward BDC.

In the combustion chamber, as the air is compressed by the movement of the piston toward the head, the air's temperature increases. When the injector starts injecting fuel into the combustion chamber, the air and fuel mix for a period of time. Then, when the air/fuel mixture reaches approximately 450 degrees to 650 degrees Fahrenheit the air/fuel mixture ignites. Once ignition begins, the temperature of the combusting air/fuel mixture significantly increases the temperature inside the combustion chamber—the combustion temperature—and consequently the pressure inside the combustion chamber. Consequently, the mixing and igniting of subsequent air/fuel mixtures during the combustion event occurs at increasingly higher combustion temperatures until a peak-combustion temperature is reached. Then, as the piston moves away from the head, the pressure in the combustion chamber decreases.

During the combustion event, the combustion temperature can increase by several processes. For example, at any instant during the combustion event, portions of the mixture ignite sequentially as a flame front progresses throughout the combustion chamber. Thus, the combustion temperature increases with the ignition of each subsequent portion. This causes the combustion temperature to increase quickly and to reach high values. As another example, fuel is continually injected into the combustion chamber and ignites after previously injected fuel has ignited. This causes the combustion temperature to increase with the ignition of each subsequent injection of fuel until the temperature reaches a steady state. When these two processes are combined, as is typical in conventional diesel engines, the combustion temperature can reach a very high value—the peak-combustion temperature.

The amount of NOx generated during combustion largely depends on the length of time the air and fuel remain in the combustion chamber before igniting, and the combustion temperature at which the air and fuel ignite. As the length of time and temperature increase, the amount of NOx generated increases. Consequently, the amount of NOx generated during the combustion event can be decreased by a several methods. Decreasing the length of time the fuel and air spend in the combustion chamber before igniting can decrease the amount of NOx generated. Decreasing the combustion temperature can also decrease the amount of NOx generated. In addition, decreasing the duration of the fuel injection can decrease the amount of NOx generated.

The amount of particulates generated during combustion depends on the amount of unburned fuel and burned oil that exists after the combustion event. The amount of unburned fuel and burned oil typically depends on the combustion temperature during the combustion event. As the combustion temperature increases, the amount of particulates generated typically decreases.

Thus, in conventional diesel engines, decreasing the amount of NOx generated during combustion often increases the amount of particulates generated, and decreasing the amount of particulates generated during combustion often increases the amount of NOx generated.

The present invention provides a piston for a diesel engine that reduces emissions generated during the combustion of fuel in a combustion chamber and a head that allows more air to flow out of the combustion chamber, and thus, more air to flow into the combustion chamber when the intake ports are open. The piston includes an igniter extending from a top section of the piston into the combustion chamber that ignites fuel injected into the combustion chamber. The top section includes a piston bowl and a squish land that agitate the air in the combustion chamber to quickly mix the fuel and air before the igniter ignites the fuel and to reduce carbon build-up from unburned fuel in the combustion chamber. By igniting the fuel quickly after it is injected into the combustion chamber, the igniter reduces the time between injection and combustion of the fuel in the combustion chamber. Thus, the amount of NOx produced during combustion is reduced. In addition, injection of the fuel can commence when the piston is closer to TDC and thus more power can be generated. By allowing more air to flow into and out of the combustion chamber, the head allows more combusted fuel to be expelled from the combustion chamber and more clean air to enter the combustion chamber to further reduce the amount of unburned fuel in the combustion chamber.

The scope of the present invention includes both means plus function and step plus function concepts. However, the terms set forth herein are not to be interpreted in the claims as indicating a "means plus function" relationship unless the word "means" is specifically recited in a claim, and are to be interpreted in the claims as indicating a "means plus function" relationship where the word "means" is specifically recited in a claim. Similarly, the terms set forth herein are not to be interpreted in method or process claims as indicating a "step plus function" relationship unless the word "step" is specifically recited in the claims, and are to be interpreted in the claims as indicating a "step plus function" relationship where the word "step" is specifically recited in a claim.

All terms used herein, including those specifically described below in this section, are used in accordance with their ordinary meaning unless the context or definition indicates otherwise. Also unless indicated otherwise, except within the claims, the use of "or" includes "and" and vice-versa. Non-limiting terms are not to be construed as limiting unless expressly stated (for example, "including" and "comprising" mean "including without limitation" unless expressly stated otherwise).

Figure 1:
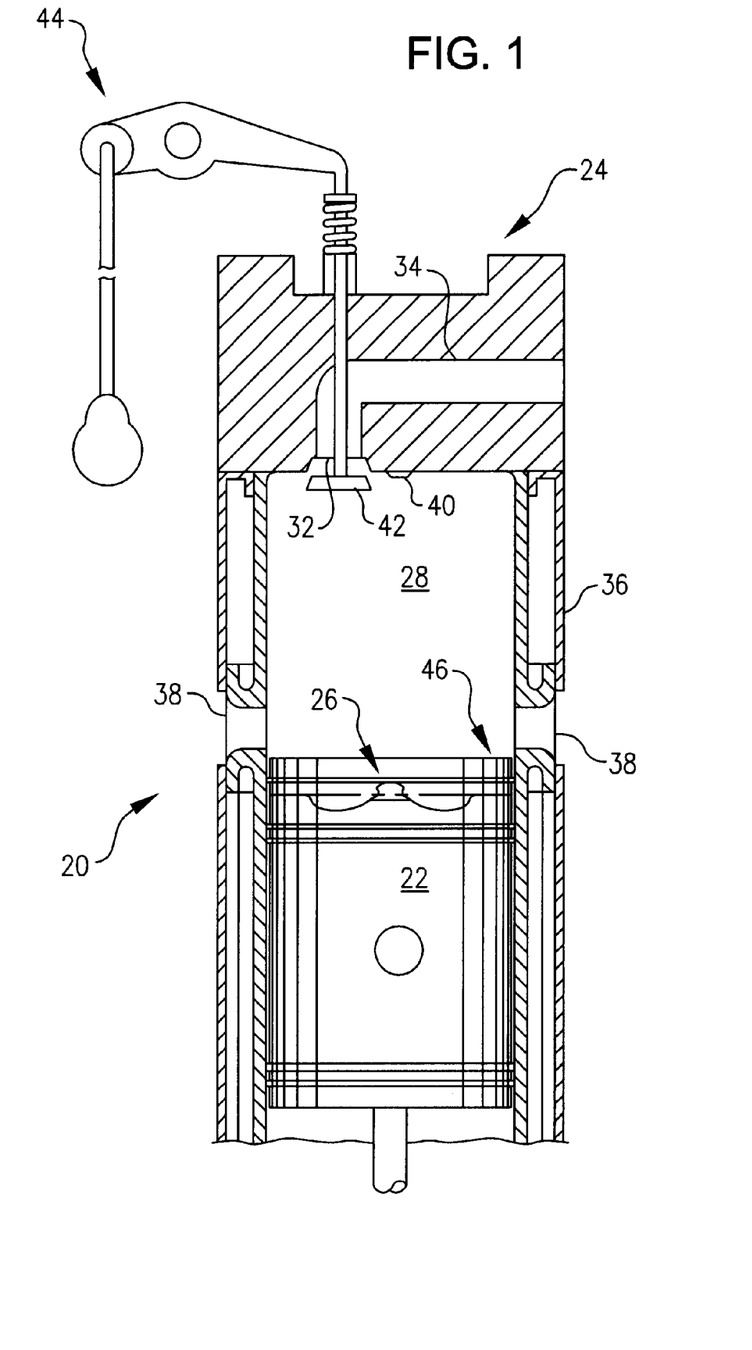
FIG. 1 is a cross section of a cylinder assembly according to an embodiment of the invention.

FIG. 1 is cross section of a cylinder assembly 20 according to an embodiment of the invention. The cylinder assembly 20 generates power using a two-stroke diesel cycle and is typically incorporated with other similar cylinder assemblies in a diesel engine. For example, a locomotive used to haul freight or passenger rail cars typically includes a two-stroke diesel engine incorporating sixteen cylinder assemblies. Or, a generator used to produce electricity typically includes a two-stroke diesel engine incorporating twenty cylinder assemblies. Or, a boat or ship can include a two-stroke diesel engine incorporating eight or twelve cylinder assemblies to propel it on a lake or ocean.

In this and certain other embodiments, the cylinder assembly 20 includes a piston 22 and a head 24 that allow the cylinder assembly 20 to generate more power while generating fewer emissions than a typical cylinder assembly used in a two-stroke diesel engine. The piston 22 includes an igniter 26 for igniting fuel as the fuel is injected into a combustion chamber 28 and a top section 46 for agitating air in the combustion chamber 28. Igniting the fuel rapidly after injection into the combustion chamber 28 reduces the time the fuel and air spend in the combustion chamber 28, and thus reduces the amount of NOx generated during the combustion event. Agitating the air in the combustion chamber 28 causes the fuel to quickly mix with air as the fuel enters the combustion chamber 28. The head 24 includes exhaust ports 32 (only one shown for clarity) and exhaust passages 34 (only one shown for clarity) that reduce the backpressure of the combusted fuel as it flows out of the combustion chamber 28. By reducing the backpressure, more air is allowed to flow into the combustion chamber 28 during the intake portion of the diesel process.

Still referring to FIG. 1, in this and certain other embodiments, the cylinder assembly 20 includes a cylinder 36 to which the head 24 is attached and in which the piston 22 reciprocates toward and away from the head 24. The cylinder 36 includes intake ports 38 through which fresh air flows into the combustion chamber 28. The cylinder assembly 20 also includes an injector 40 disposed in the head 24 for injecting fuel into the combustion chamber 28. In addition, the cylinder assembly 20 includes exhaust valves 42 (only one shown for clarity), each corresponding to one of the exhaust ports 32, for selectively opening and closing the exhaust ports 32 (shown open in FIG. 1). The cylinder assembly 20 also includes a rocker and cam assembly 44 for opening and closing the exhaust ports 32 at a specific time in the operation of the cylinder assembly 20.

Still referring to FIG. 1, in operation the cylinder assembly 20 includes an air intake event, a combustion event and an exhaust event. In this and certain other embodiments, when the piston 22 is at BDC, as shown in FIG. 1, air flows through the intake ports 38 into the combustion chamber 28 and previously combusted fuel flows through the exhaust ports 32 just previously opened. As the piston 22 moves toward the head 24, the piston closes the intake ports 38 and helps expel the combusted fuel through the exhaust ports 32. After all or substantially all of the combusted fuel has been expelled, the rocker and cam assembly 44 retract the exhaust valve 42 to close the exhaust port 32. Now, as the piston 22 continues to move toward the head 24, the piston 22 agitates and compresses the air in the combustion chamber 28. As the piston 22 approaches the head 24, the injector 40 injects fuel into the combustion chamber 28, and the igniter 26 ignites the fuel as discussed in greater detail elsewhere herein. The injector 40 continues to inject fuel into the combustion chamber 28 as the piston 22 reaches TDC and stops injecting fuel shortly after the piston 22 begins to move away from the head 24. Shortly before the piston 22 reaches BDC, the exhaust ports 32 open again. Then, the intake ports 38 open again and the operation can repeat itself.

Although the cylinder assembly 20 shown and described uses a two-stroke diesel cycle, the piston 22 can be included in a cylinder assembly that uses a four-stroke diesel cycle. Furthermore, by including intake ports and corresponding intake valves in the head 24, the head 24 can be included in a cylinder assembly that uses a four-stroke diesel cycle.

Figure 2:
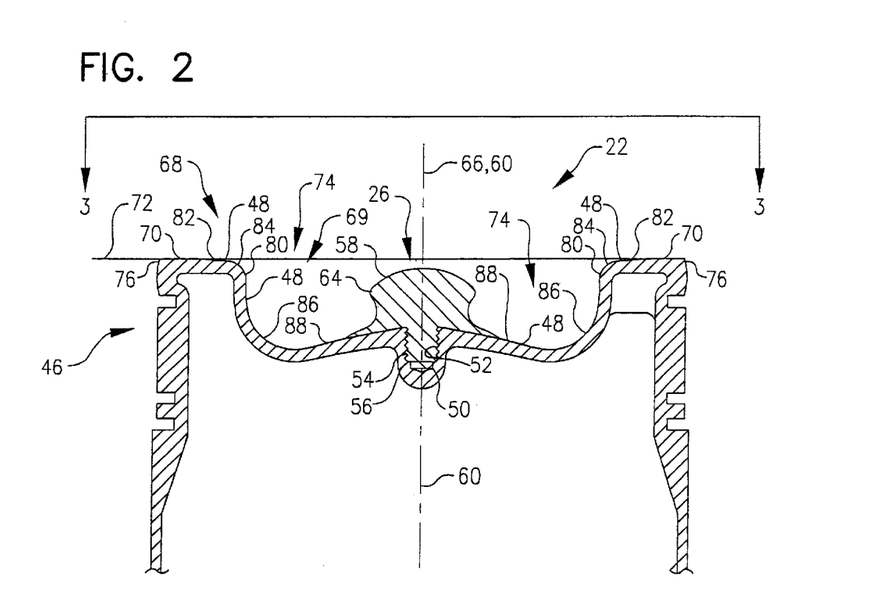
FIG. 2 is a cross section of a portion of the piston in FIG. 1 according to an embodiment of the invention.
Figure 3:
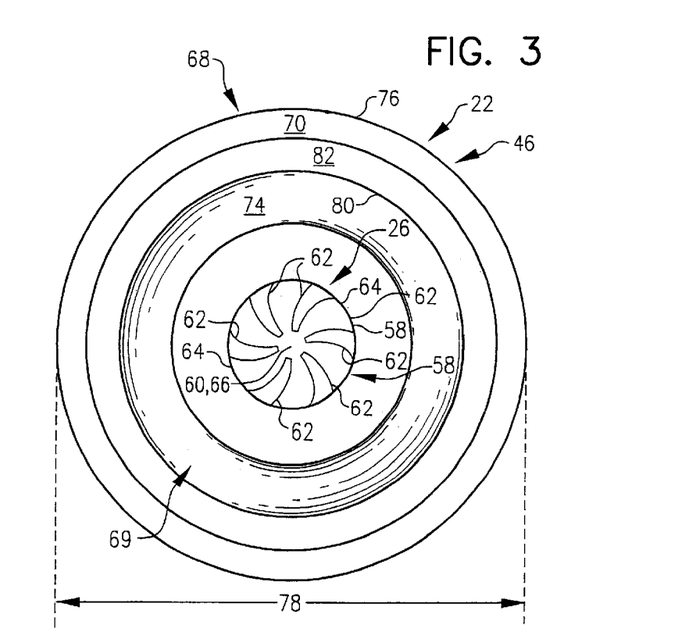
FIG. 3 is a plan view taken substantially along the line 3—3 of the piston in FIG. 2.

FIG. 2 is a cross section of the piston 22 in FIG. 1 according to an embodiment of the invention. FIG. 3 is a plan view of the piston 22 in FIGS. 1 and 2 according to an embodiment of the invention. In this and certain other embodiments, the top section 46 of the piston 22 includes a combustion-chamber surface 48 formed to agitate air in the combustion chamber 28 (FIG. 1) as the piston 22 moves toward the head 24 (FIG. 1). Extending from the combustion chamber surface 48, the igniter 26 radiates heat to the fuel as the fuel is injected into the combustion chamber 28 to ignite the fuel. In addition, the igniter 26 can also agitate air in the combustion chamber 28 as the piston 22 moves toward the head 24.

Referring to FIG. 2, the igniter 26 can be attached to the top section 46 using any desired fastening technique that can withstand the extreme thermal and mechanical stresses the top section 46 and igniter 26 can experience during combustion. For example, in this and certain other embodiments, the igniter 26 can include a stud 50 having external threads 52, and the top section 46 can include a bore 54 having internal threads 56 sized to threadingly receive the external threads 52 of the stud 50. In other embodiments, the top section 46 can include a stud having external threads and the igniter 26 can include a bore having internal threads sized to threadingly receive the external threads of the stud. These embodiments may be desirable to releasably attach the igniter 26 to the top section 46. In still other embodiments, the igniter 26 can be forged or cast as part of the top section 46.

If the igniter 26 is releasably attached to the top section 46, one can install different igniters 26 that have different shapes or are made from different materials. This may be desirable when one desires to change other components of the cylinder assembly 20, such as the injector 40 (FIG. 1) to take advantage of different operating conditions or to generate different performance characteristics.

Still referring to FIG. 2, the igniter 26 can be made of any desirable material that retains more heat from the combustion process than the top section 46 retains. For example, in this and certain other embodiments, the igniter 26 can be made of a material that includes Incone® 625 or Inconel® 750x or other nickel based alloys. By retaining more heat than the top section 46 of the piston 22, the igniter can radiate heat to the fuel as the fuel is injected into the combustion chamber 28.

Still referring to FIG. 2, the igniter 26 can be any shape desired and can include a top surface 58 that radiates heat to the fuel as the fuel is injected into the combustion chamber 28. For example, in this and certain other embodiments, the igniter 26 can be shaped like a mushroom and the top surface 58 can be convex. In other embodiments, the igniter 26 can be shaped like a cylindrical can and the top surface 58 can be flat or concave.

Referring to FIG. 3, the top surface 58 can be profiled for agitating air in a plane that is perpendicular or substantially perpendicular to the piston's direction of movement toward and away from the head 24. For example, in this and certain other embodiments, the top surface 58 can include grooves 62 that extend from the peripheral edge 64 of the igniter 26 toward a longitudinal igniter axis 66 to channel the air toward the peripheral edge 64. To agitate the air, the grooves 62 can curve as they extend from the peripheral edge 64 toward the longitudinal igniter axis 66. In other embodiments, the top surface 58 can include vanes or ridges that extend from the top surface 58.

Referring to FIGS. 2 and 3, in this and certain other embodiments, the top section 46 can include a squish land 68 and a piston bowl 69 to agitate air in a direction substantially toward and away from the head 24. The squish land 68 can include a first portion 70 of the combustion-chamber surface 48 that defines a piston plane 72, which can be perpendicular to the longitudinal piston axis 60, and the piston bowl 69 can include a second portion 74 of the combustion-chamber surface 48.

Still referring to FIGS. 2 and 3, the squish land 68 can be any shape desired and can be defined relative to a longitudinal piston axis 60, the piston plane 72 and a periphery 76 of the combustion-chamber surface 48 that is defined by a piston diameter 78. For example, in this and certain other embodiments the squish land 68 can form an annulus centered or substantially centered on the longitudinal piston axis 60 and can extend sixteen percent or substantially sixteen percent of the piston diameter 78 from the periphery 76 toward the longitudinal piston axis 60. The squish land 68 can also include an inside edge 80 and a squish surface 82 that helps agitate air in a plane parallel or substantially parallel to the longitudinal piston axis 60. The squish surface 82 can extend eight percent or substantially eight percent of the piston diameter 78 from the inside edge 80 toward the periphery 76 and can decline three degrees or substantially three degrees from the piston plane 72.

Still referring to FIGS. 2 and 3, the piston bowl 69 can be any shape desired and can be defined relative to the longitudinal piston axis 60, the piston plane 72 and the piston diameter 78. For example, in this and certain other embodiments, the piston bowl 69 can be centered or substantially centered on the longitudinal piston axis 60 and can include a bowl diameter sixty-five percent or substantially sixty-five percent of the piston diameter 78. The piston bowl 69 can also include a transition radius 84 four percent or substantially four percent of the piston diameter 78 that transitions the combustion chamber surface 48 from the squish land 68 to the piston bowl 69. The piston bowl 69 can also include a bowl radius 86 nine percent or substantially nine percent of the piston diameter 78 and can be located seven percent or substantially seven percent of the piston diameter 78 below the piston plane 72 and twenty-three percent or substantially twenty -three percent of the piston diameter 78 from the longitudinal piston axis 60. The piston bowl 69 can also include a bowl surface 88 that can extend from the bowl radius 86 toward the longitudinal piston axis 60 and can be declined eleven degrees or substantially eleven degrees relative to the piston plane 72.

Figure 4:
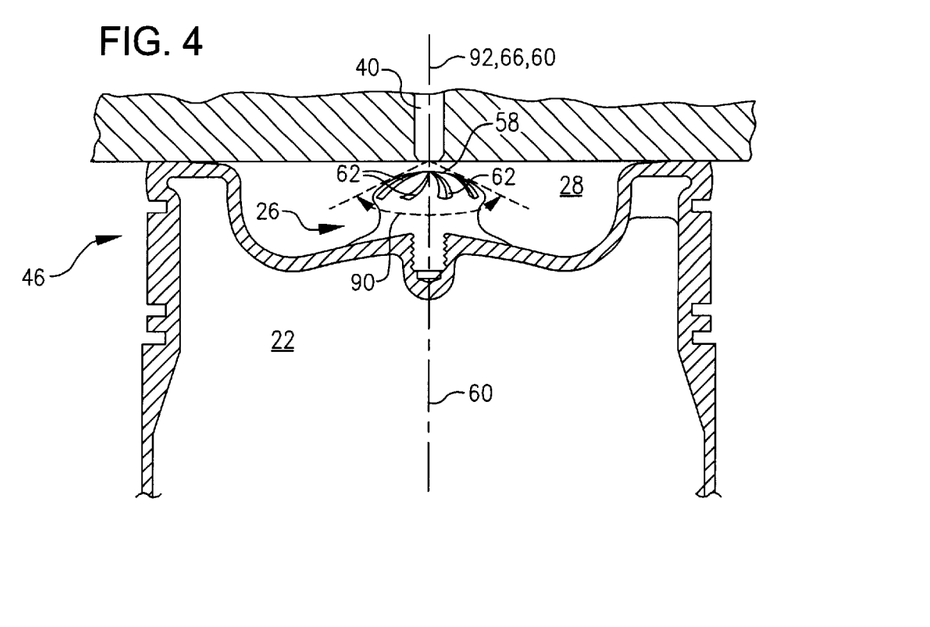
FIG. 4 is a cross section of a portion of the cylinder assembly in FIG. 1 showing fuel injected into a combustion chamber according to an embodiment of the invention.

FIG. 4 is a cross section of a portion of the cylinder assembly 20 in FIG. 1 showing the igniter 26 as fuel is injected during the combustion event. The igniter 26 radiates heat from the top surface 58 to ignite the fuel as the fuel enters the combustion chamber 28 (FIG. 1). To quickly mix the fuel and air as the fuel enters the combustion chamber 28, the top section 46 of the piston 22 and the grooves 62 in the top surface 58 agitate the air in the combustion chamber 28. To ignite the fuel as the fuel is injected into the combustion chamber 28, the location and shape of the igniter 26 and the pattern of the fuel injection can be designed to pass the air/fuel mixture across a portion of the top surface 58. Thus, the peak-combustion temperature and the amount of time spent mixing the fuel and air inside the combustion chamber 28 are reduced. Consequently, the levels of NOx generated during combustion are reduced.

Still referring to FIG. 4, the location of the igniter 26 relative to the injector 40, and the size and shape of the igniter 26 relative to the pattern of the fuel injection can be modified as desired. For example, in this and certain other embodiments, the injector 40 can inject fuel into the combustion chamber 28 in a conical pattern having a cone angle 90 equal to 125 degrees or substantially 125 degrees and a longitudinal injection axis 92. Additionally or alternatively, the injector can inject a portion of the fuel directly onto the top surface 58, for example, along the longitudinal injection axis 92. The igniter 26 can be located relative to the injector 40 such that the longitudinal igniter axis 66 can align with the longitudinal injection axis 92, and can be sized such that the top surface 58 can contact the cone of fuel when the piston 22 is at TDC. This may be desirable when quick ignition of the fuel is desired. In other embodiments, the longitudinal igniter axis 66 can be aligned with the longitudinal injection axis 92, the cone angle 90 can be one hundred sixty degrees or substantially 160 degrees and the igniter 26 can be sized to not contact the cone of fuel when the piston 22 is at TDC. This may be desirable when a more thorough mixture of the air and fuel before ignition of the fuel is desired or when a combustion delay is desired. In other embodiments, the longitudinal igniter axis 66 may not be aligned with the longitudinal injection axis 92 and the injector 40 may not inject the fuel in a conical pattern. This may be desirable when the shape of the piston's top section 46 is different than as shown in FIGS. 2 and 3, or when one is restricted to placing the injector 40 at a different location in the combustion chamber 28.

In most conventional cylinder assemblies, injection typically starts between 18 degrees and 16 degrees before TDC to allow the fuel and air to thoroughly mix before combusting and typically lasts for eighteen to thirty degrees of crankshaft rotation. This attempts to promote simultaneous combustion of the fuel in the combustion chamber to reduce the peak-combustion temperature. But, starting injection at 18 to 16 degrees before TDC means that the combustion event starts at a combustion chamber pressure lower than the combustion chamber pressure at TDC. Because combustion before TDC generates a combustion chamber pressure that actually opposes the motion of the piston 22, some of the energy released during the combustion event is not used to generate power and actually reduces the amount of power generated. Thus, for a unit of fuel, the power generated is less than ideal.

However, by igniting the fuel shortly after entering the combustion chamber 28, injection of the fuel can start when the piston 22 is closer to TDC, and thus, the power generated for a unit of fuel can be increased. For example, in this and certain other embodiments, the injection can start when the piston 22 is at 10 degrees or substantially 10 degrees before TDC and can stop when the piston 22 is at 12 degrees or substantially 12 degrees after TDC. Or, the injection can start when the piston 22 is at 11 degrees or substantially 11 degrees before TDC and can stop when the piston 22 is at 15 degrees or substantially 15 degrees after TDC.

Figure 5:
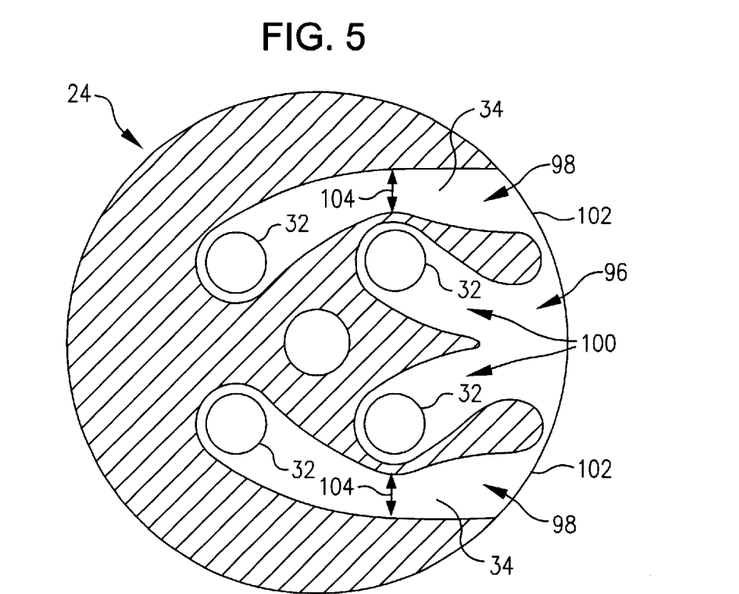
FIG. 5 is a cross section of the head in FIG. 1 according to an embodiment of the invention.

FIG. 5 is a cross section of the head 24 in FIG. 1 according to an embodiment of the invention. The head 24 increases airflow out of the combustion chamber 28 (FIG. 1) when the exhaust ports 32 (FIG. 1) are open, and thus, increases airflow into the combustion chamber 28 when the intake ports 38 (FIG. 1) are open. This increase in airflow through the combustion chamber 28 reduces the amount of unburned fuel in the combustion chamber 28 after the combustion event by allowing more fuel to mix with fresh air and combust and by causing more of the combusted fuel to be expelled from the combustion chamber 28.

In this and certain other embodiments, the head 24 can include three or more exhaust ports 32, a primary chamber 96 that receives a flow of combusted fuel (not shown) through two or more of the exhaust ports 32 and directs the flow out of the head 24, and one or more passages 34 that receive a flow of combusted fuel through one or more of the remaining exhaust ports 32 and directs the flow out of the head 24. The combination of directing the flow of combusted fuel from two or more exhaust ports 94 into the primary chamber 96 and then out of the head 24, and directing the flow of combusted fuel from one or more remaining exhaust ports 94 out of the head 24, reduces the backpressure of all of the combusted fuel expelled through the exhaust ports 94. By reducing the backpressure more combusted fuel can be expelled through the head 24.

Still referring to FIG. 5, in this and certain other embodiments, the head 24 can include four exhaust ports 32, two long passages 98 and two short passages 100. The short passages 100 each connect one of two respective exhaust ports 32 to the primary chamber 96. The long passages 98 each connect one of two respective remaining exhaust ports 32 to the head boundary 102 where the flow is expelled from the head 24. The short and long passages 100 and 98, respectively, are sized to receive all of the combusted fuel from their respective exhaust ports 32 and convey the combusted fuel to the head boundary 102. At the head boundary 102, an exhaust manifold (not shown) may or may not be attached to the head 24 to collect combusted gases from one or more cylinder assemblies (depending on how many cylinder assemblies form an engine) and convey the combusted gases away from the engine.

Still referring to FIG. 5, the long passages 98 can be configured as desired to reduce the backpressure of the flow of combusted fuel through their respective exhaust ports 32. For example, in this and certain other embodiments, each long passage 98 can include a narrow section 104 where the cross-sectional area of the passage 98 is less than the cross-sectional areas of other sections of the passage 98. As the combusted fuel flows through the narrow section 104, the flow increases speed, and then as the combusted fuel flows through the remaining section of the passage 98, the flow expands. Consequently, the combusted fuel flow's dynamic pressure decreases and thus reduces the backpressure in the combusted fuel flow.

Still referring to FIG. 5, the passages 98 and 100 and the primary chamber 96 can be formed in the head as desired. For example, in this and certain other embodiments, the passages 98 and 100 and the primary chamber 96 can be formed in the head 24 when the head 24 is cast, and thus be integral to the head. In other embodiments, the passages 98 and 100 and the primary chamber 96 can be formed from tubing of any desired material that can withstand excessive temperatures in the combusted fuel flow and can be attached to the head 24 by any desired fastening technique, such as studs threaded into the head 24.

Figure 6:
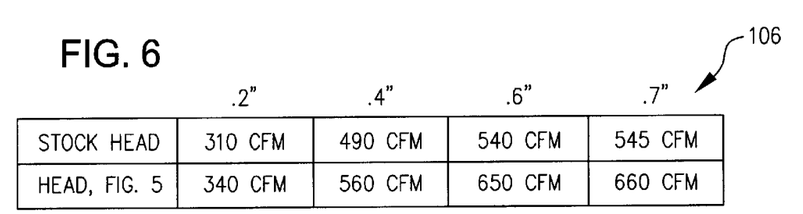
FIG. 6 is a table comparing airflow values through the head in FIGS. 1 and 5 with a conventional head.

FIG. 6 is a table 106 of airflow values—in cubic feet per minute or CFM—and illustrates the increase in airflow obtained when using the head 24 in FIGS. 1 and 5 instead of conventional heads. The table 106 presents the airflow values as a function of exhaust valve lift—the distance in inches between the exhaust valve 42 (FIG. 1) and exhaust port 32 (FIGS, 1 and 5) when the exhaust port 32 is open. As can be seen in the table 106, the passages 98 (FIG. 5) and 100 (FIG. 5) and the primary chamber 96 (FIG. 5) increases the airflow through the head 24 at any exhaust valve lift. Furthermore, the airflow increases by 21% or substantially 21% for an exhaust valve lift of 0.7 inches.

Figure 7:
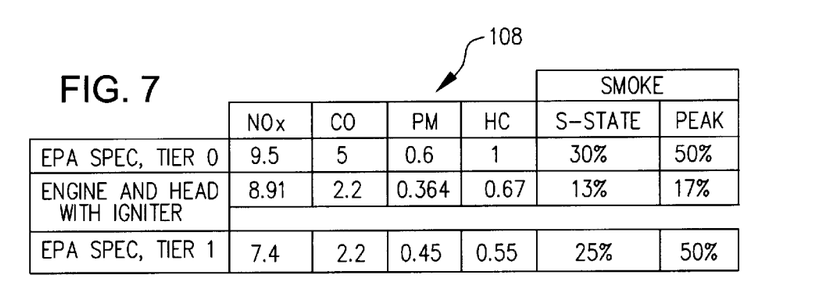
FIG. 7 is a table comparing emission levels mandated by the EPA and generated by the cylinder assembly in FIG. 1.

FIG. 7 is a table 108 of the quantity of various emission components generated by an internal combustion engine. The table 108 illustrates the EPA mandated limits for diesel locomotives and the actual levels of the emission components generated by a diesel engine incorporating 16 cylinder assemblies 20 (FIG. 1). As can be seen in the table 108, the 16 cylinder assemblies 20 generate levels of NOx, CO, PM, HC, and Smoke that are below the EPA mandated Tier 0 level for all rebuilt engines originally manufactured between Jan. 1, 1973 and Jan. 1, 2000. Thus, the emissions from the cylinder assembly 20 typically contain concentrations of NOx and particulates that meet or fall below the EPA established limits of 9.5 grams per horsepower-hour and 0.6 grams per horsepower-hour, respectively.

Although a cylinder assembly, piston, igniter and head have been described in considerable detail with reference to certain embodiments for purposes of illustration, other embodiments are possible. Therefore the spirit and scope of the appended claims should not be limited to the above description of the embodiments; the present inventions include suitable modifications as well as all permutations and combinations of the subject matter set forth herein.

What is claimed is:

1. A two-cycle diesel engine comprising:
   a cylinder;
   a head connected to the cylinder and operable to remove combusted fuel from a combustion chamber;
   a piston movable within the cylinder toward and away from the head and including an igniter operable to ignite fuel in the combustion chamber; and
   an injector operable to inject fuel into the combustion chamber.

2. The diesel engine of claim 1 wherein the piston includes a top section operable to agitate air in the combustion chamber when the piston moves toward the head.

3. The diesel engine of claim 2 wherein the top section agitates air in a direction substantially toward and away from the head.

4. The diesel engine of claim 1 wherein the igniter is operable to agitate air in the combustion chamber when the piston moves toward the head.

5. The diesel engine of claim 4 wherein the igniter agitates air in a plane that is perpendicular or substantially perpendicular to the piston's movement toward the head.

6. The diesel engine of claim 1 wherein:
   the igniter includes a longitudinal igniter axis; and
   the injector injects the fuel into the combustion chamber in the shape of a cone that includes a longitudinal injection axis, wherein the longitudinal igniter axis and the longitudinal injection axis are collinear or substantially collinear.

7. The diesel engine of claim 1 wherein the head is operable to convey the combusted fuel to an exhaust manifold and includes:
   three or more exhaust ports;
   a primary chamber that receives combusted fuel through two of the exhaust ports and conveys the combusted fuel to the exhaust manifold; and one or more passages that receive combusted fuel through one or more of the remaining exhaust ports and convey the combusted fuel to the exhaust manifold.

8. The diesel engine of claim 7 wherein the head includes:

four exhaust ports;

two short passages each connecting one of two respective exhaust ports to the primary chamber; and two long passages each connecting one of two respective remaining exhaust ports to the exhaust manifold.

9. The diesel engine of claim 1 wherein the injector injects fuel when the piston is located at 10 degrees or substantially 10 degrees before top dead center and stops injecting fuel into the combustion chamber when the piston is located at 12 degrees or substantially 12 degrees after top dead center.

10. The diesel engine of claim 6 wherein the injector injects a portion of the fuel along the longitudinal injection axis.

11. The diesel engine of claim 9 wherein the injector injects fuel into the combustion chamber in the shape of a cone having a cone angle of 125 degrees or substantially 125 degrees.

12. The diesel engine of claim 1 wherein the diesel engine includes 16 cylinders, 16 heads, 16 pistons and 16 injectors.

13. A piston comprising:

a top section having a combustion-chamber surface; and an igniter extending from the combustion-chamber surface and operable to ignite fuel in a combustion chamber.

14. The piston of claim 13 wherein the igniter is releasably attached to the top section.

15. The piston of claim 13 further comprising a longitudinal piston axis, and wherein the igniter is attached to the top section of the piston at the longitudinal piston axis.

16. The piston of claim 13 further comprising a longitudinal piston axis, and wherein:

the top section includes a bore located at the longitudinal piston axis and having internal threads; and the igniter includes a stud having external threads that are threadingly received by the internal threads of the bore to attach the igniter to the top portion.

17. The piston of claim 13 wherein the igniter comprises Inconel® 625.

18. The piston of claim 13 wherein the igniter comprises Inconel® 750X.

19. The piston of claim 13 wherein the igniter includes a top surface operable to radiate heat retained by the igniter to ignite the fuel.

20. The piston of claim 19 wherein the igniter is shaped like a mushroom and the top surface is convex.

21. The piston of claim 19 wherein:

the igniter has a longitudinal igniter axis and is shaped like a mushroom; and the top surface is convex and includes a peripheral edge and one or more grooves that extend from the peripheral edge toward the longitudinal igniter axis.

22. The piston of claim 21 wherein the one or more grooves curve as the one or more grooves extend from the peripheral edge toward the longitudinal axis.

23. The piston of claim 13 wherein:

the combustion-chamber surface includes a periphery defined by a piston diameter; and the top section includes:

a squish land located at the periphery and including a first portion of the combustion-chamber surface, wherein the first portion of the combustion-chamber surface defines a piston plane; and a piston bowl including a second portion of the combustion-chamber surface.

24. The piston of claim 23 further comprising a longitudinal piston axis that is perpendicular or substantially perpendicular to the piston plane, and wherein:

the squish land forms an annulus centered or substantially centered on the longitudinal piston axis, includes an inside edge and a squish surface, and extends 16% or substantially 16% of the piston diameter from the periphery of the combustion-chamber surface toward the longitudinal piston axis, wherein the squish surface extends 8% or substantially 8% of the piston diameter from the inside edge toward the periphery of the combustion-chamber surface and is declined 3 degrees or substantially 3 degrees from the piston plane; and the piston bowl is centered or substantially centered on the longitudinal piston axis and includes, a bowl diameter, a transition radius, a bowl radius and a bowl surface, wherein the bowl diameter is 65% or substantially 65% of the piston diameter, the transition radius is 4% or substantially 4% of the piston diameter and transitions the combustion-chamber surface from the squish land to the piston bowl, the bowl radius is 9% or substantially 9% of the piston diameter and located 7% or substantially 7% of the piston diameter below the piston plane and 23% or substantially 23% of the piston diameter from the longitudinal piston axis, and the bowl surface extends from the longitudinal piston axis toward the bowl radius and is declined 11 degrees or substantially 11 degrees from the piston plane.

25. A method of igniting fuel in a combustion chamber of a diesel engine, comprising:

placing an igniter on a combustion-chamber surface of a piston;

heating a top surface of the igniter;

injecting fuel into a combustion chamber across a portion of the top surface; and radiating heat from the top surface.

26. The method of claim 25 further comprising retaining heat in the igniter generated from the combustion of the fuel.

* * * * *